(12) United States Patent
Abd Elhamid et al.

(10) Patent No.: US 7,687,175 B2
(45) Date of Patent: Mar. 30, 2010

(54) HYBRID BIPOLAR PLATE ASSEMBLY AND DEVICES INCORPORATING SAME

(75) Inventors: Mahmoud H. Abd Elhamid, Grosse Pointe Woods, MI (US); Richard H. Blunk, Macomb Township, Macomb County, MI (US); Youssef M. Mikhail, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1708 days.

(21) Appl. No.: 10/837,936

(22) Filed: May 3, 2004

(65) Prior Publication Data

US 2005/0244700 A1 Nov. 3, 2005

(51) Int. Cl.
*H01M 8/00* (2006.01)
*H01M 2/14* (2006.01)

(52) U.S. Cl. .............................. 429/34; 429/36; 429/38; 429/39

(58) Field of Classification Search ............... 429/12–46
See application file for complete search history.

(56) References Cited

U.S. PATENT DOCUMENTS

| | | | | |
|---|---|---|---|---|
| 4,214,969 A | * | 7/1980 | Lawrance | 204/255 |
| 5,624,769 A | * | 4/1997 | Li et al. | 429/32 |
| 6,495,278 B1 | * | 12/2002 | Schmid et al. | 429/30 |
| 6,562,507 B1 | | 5/2003 | Cisar et al. | 429/40 |
| 6,660,419 B1 | * | 12/2003 | Nishida et al. | 429/32 |
| 6,794,078 B1 | * | 9/2004 | Tashiro et al. | 429/34 |
| 2002/0004158 A1 | * | 1/2002 | Suzuki et al. | 429/34 |
| 2002/0009630 A1 | * | 1/2002 | Gao et al. | 429/34 |
| 2002/0061430 A1 | * | 5/2002 | Wakahoi et al. | 429/32 |
| 2003/0064273 A1 | * | 4/2003 | Ohtani et al. | 429/34 |
| 2004/0028980 A1 | | 2/2004 | Hashimoto et al. | |
| 2004/0062974 A1 | | 4/2004 | Abd Elhamid et al. | |
| 2005/0014037 A1 | * | 1/2005 | Boyer et al. | 429/12 |
| 2005/0100771 A1 | * | 5/2005 | Vyas et al. | 429/32 |
| 2007/0048588 A1 | * | 3/2007 | Abd Elhamid et al. | 429/38 |

FOREIGN PATENT DOCUMENTS

| | | | |
|---|---|---|---|
| DE | 10330832 A1 | | 2/2004 |
| EP | 1367663 A2 | | 12/2003 |
| JP | 10228914 | * | 8/1998 |
| WO | WO0143217 | * | 6/2001 |
| WO | 2004066414 A2 | | 8/2004 |

OTHER PUBLICATIONS

JPO IPDL machine translation of JP10228914, published Aug. 25, 1998, retrieved Aug. 5, 2008.*
International Search Report re Appln. No. PCT/US05/13780 dated Jul. 14, 2006 corresponding to this application.

* cited by examiner

*Primary Examiner*—Dah-Wei D Yuan
*Assistant Examiner*—Katherine Turner

(57) ABSTRACT

A hybrid bipolar plate assembly comprises a metallic anode plate, a polymeric composite cathode plate, and a metal layer positioned between the metallic anode plate and the composite cathode plate. The metallic anode and composite cathode plates can further comprise an adhesive sealant applied around the outer perimeter to prevent leaking of coolant. The assembly can be incorporated into a device comprising a fuel cell. Further, the device can define structure defining a vehicle powered by the fuel cell.

22 Claims, 4 Drawing Sheets

HYBRID BIPOLAR PLATE ASSEMBLY AND DEVICES INCORPORATING SAME

BACKGROUND OF THE INVENTION

Fuel cell systems with bipolar plates are known.

SUMMARY OF THE INVENTION

Fuel cells such as, for example, proton exchange membrane (PEM) fuel cells, produce electrical energy through hydrogen oxidation and oxygen reduction. The byproduct of these catalytic reactions is water. A typical cell comprises a polymer membrane (e.g., proton exchange membrane) that is positioned interjacent a pair of gas diffusion media and catalyst layers. A cathode plate and an anode plate are positioned at the outermost sides adjacent the gas diffusion media layers, and the preceding components are tightly compressed to form the cell unit.

The voltage provided by a single cell unit is typically too small for useful application. Accordingly, a plurality of cells are typically arranged and connected consecutively in a "stack" to increase the electrical output of the electrochemical conversion assembly or fuel cell. In this arrangement, two adjacent cell units can share a common polar plate, which serves as the anode and the cathode for the two adjacent cell units it connects in series. Such a polar plate is commonly referred to as a "bipolar plate".

Bipolar plates for fuel cells have to be electrochemically stable, electrically conductive, and inexpensive in order to comply with current manufacturing specifications. Both metallic and polymeric (composite) bipolar plates fulfill these criteria. However, composite plates are permeable to hydrogen, which can lead to significant losses in performance and efficiency. Such hydrogen permeation through composite plates can result in the presence of hydrogen in the coolant loops, which requires venting thereof. This is not practical, as the venting of the coolant loops would lead to the evaporation of the coolant.

Unlike composite bipolar plates, metallic plates are essentially impermeable to molecular hydrogen. However, metallic plates in contrast are relatively more expensive than composite plates, and are typically associated with low performance cells. By "low performance cells", we mean a cell within a fuel cell stack that exhibits a higher resistance than the remaining cells, such as, for example, between about 200 and about 250 mOhm-cm$^2$. Although not intending to be limited to any particular theory, it is contemplated that the poor performance of metallic bipolar plates is related to water management and, more particularly, to water management at the cathode side of the fuel cell, where water is produced. Accordingly, there is a recognized need for improvements in bipolar plate design for fuel cell stacks.

The present invention fulfills this need by providing a hybrid bipolar plate assembly for use in a fuel cell, which assembly combines the useful properties of both metal and composite materials. Although the present invention is not limited to specific advantages or functionality, it is noted that the hybrid bipolar plate assembly prevents plate to plate hydrogen permeation, and eliminates hydrogen permeation through the plate to the coolant. The hybrid bipolar plate assembly enhances the performance, efficiency and durability of the fuel cell stack. Moreover, the present invention eliminates hydrogen leaking to the environment, and allows for cost reduction by employing less stainless steel than a typical metallic bipolar plate.

In accordance with one embodiment of the present invention, a hybrid bipolar plate assembly is provided comprising a metallic anode plate, a polymeric composite cathode plate, and a first layer comprising at least one of gold, silver and alloys of each positioned between the metallic anode plate and the composite cathode plate.

In accordance with another embodiment of the present invention, a device is provided comprising a polymer membrane, first and second catalyst layers, first and second gas diffusion media layers, and at least one hybrid bipolar plate assembly. The polymer membrane defines opposing cathode and anode faces on opposite sides of the membrane. The first and second catalyst layers define opposing inside and outside faces on opposite sides of the catalyst. The inside face of the first catalyst layer engages the cathode face of the polymer membrane, and the inside face of the second catalyst layer engages the anode face of the polymer membrane. The first and second gas diffusion media layers define opposing inside and outside faces on opposite sides of the gas diffusion media. The inside face of the first gas diffusion media layer engages the outside face of the first catalyst layer, and the inside face of the second gas diffusion media layer engages the outside face of the second catalyst layer. The hybrid bipolar plate assembly engages at least one of the first and second gas diffusion media layers. Also, the hybrid bipolar plate assembly comprises a metallic anode plate, a composite cathode plate, and a layer comprising at least one of gold, silver and alloys of each. The metallic anode plate defines opposing first and second major faces on opposite sides of the metallic anode plate, and the composite cathode plate comprises a polymeric material. The layer that can comprise at least one of gold, silver and alloys of each engages at least one of the first and second major faces of the metallic anode plate. The device can comprise a fuel cell, and the device can further comprise structure defining a vehicle powered by the fuel cell.

In accordance yet with another embodiment of the present invention, a hybrid bipolar plate assembly is provided comprising a metallic anode plate, a composite cathode plate, a layer comprising at least one of gold, silver and alloys of each positioned between the metallic anode plate and the composite cathode plate, and an adhesive. The metallic anode plate comprises a corrosion-resistant iron-chromium alloy, and the composite cathode plate comprises a polymeric material and between about 10 and about 90% by weight graphite powder. The polymeric material can be selected from thermosetting resin, thermoplastic resin, or combinations thereof. The thermosetting resin can comprise at least one of epoxies, malamines, phenolics, ureas, vinyl esters, liquid crystalline polymers, and combinations thereof. Also, the thermoplastic resin can comprise at least one of styrenes, acrylics, cellulosics, polyethylenes, polypropylene, liquid crystalline polymers, vinyls, nylons, fluorocarbons, polyphenylene sulfides, and combinations thereof. In addition, the web thickness of the metallic anode plate is less than the web thickness of the composite cathode plate. The adhesive is configured to seal the metallic anode plate and the composite cathode plate around the outer perimeter of the hybrid bipolar plate assembly, such that coolant is prevented from leaking out from between the metallic anode plate and the composite cathode plate. Optionally, the hybrid bipolar plate assembly can comprise a gasket configured to prevent coolant from leaking out from between the metallic anode plate and the composite cathode plate.

In accordance with still yet another embodiment of the present invention, a hybrid bipolar plate assembly is provided comprising an anode plate comprising a first layer and a second layer, the first layer comprising a first metal, the second layer comprising a second metal, and wherein the second layer is chemically stable in the presence of coolant. The assembly can further comprise a composite cathode plate, and the anode plate can be substantially devoid of any oxide on the first layer. The anode plate can comprise a coolant face and the first metal can comprise iron and Cr, wherein any oxides of Cr have been substantially removed from the coolant face. The second metal can comprise at least one of gold, silver and alloys of each.

These and other features and advantages of the invention will be more fully understood from the following detailed description of the invention taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiment(s) of the present invention.

DETAILED DESCRIPTION OF SOME EMBODIMENTS OF THE INVENTION

Figure 1:
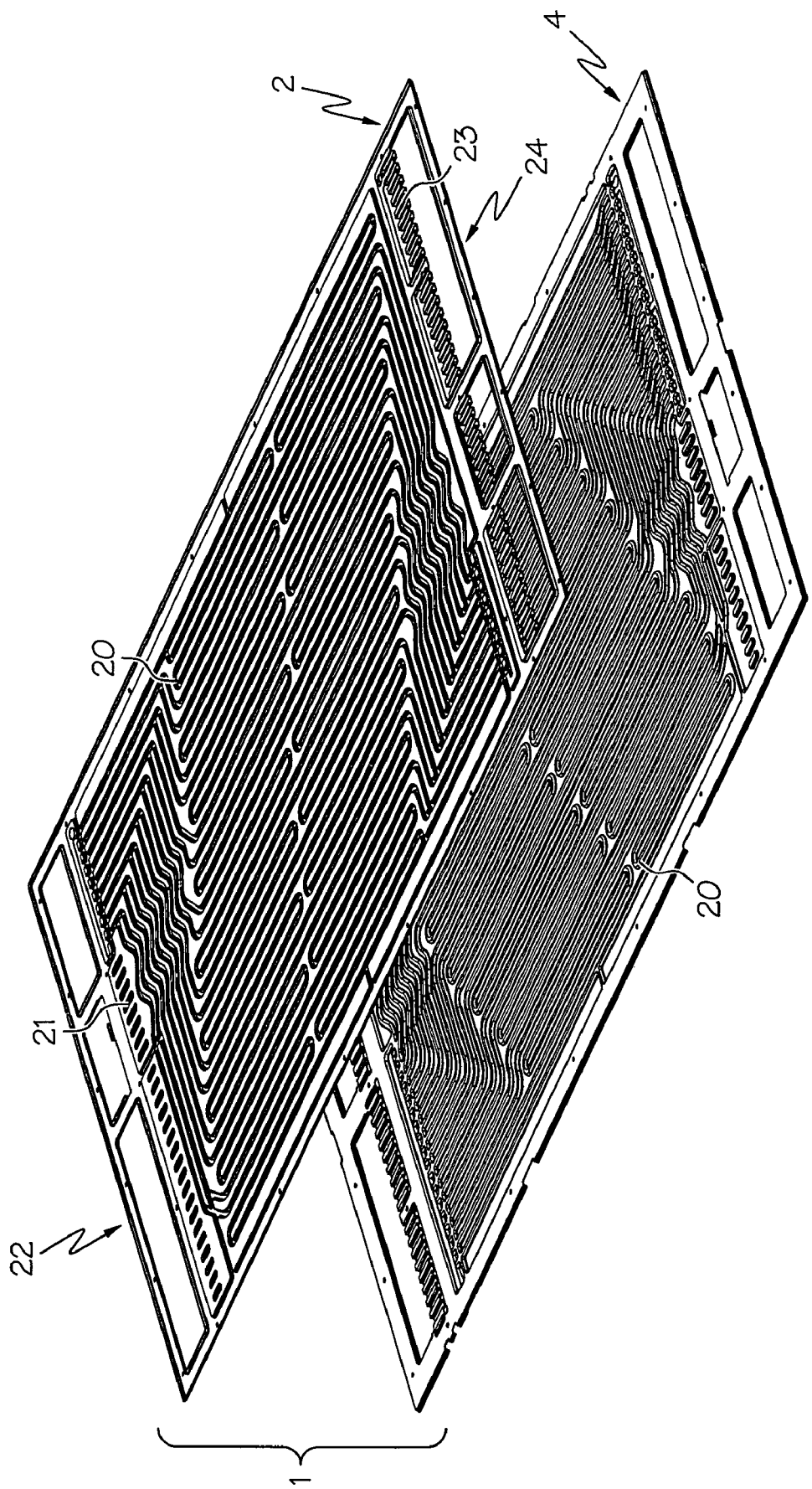
FIG. 1 is an isometric, exploded view of a hybrid bipolar plate assembly, anode side up, in accordance with the principals of the present invention.
Figure 2:
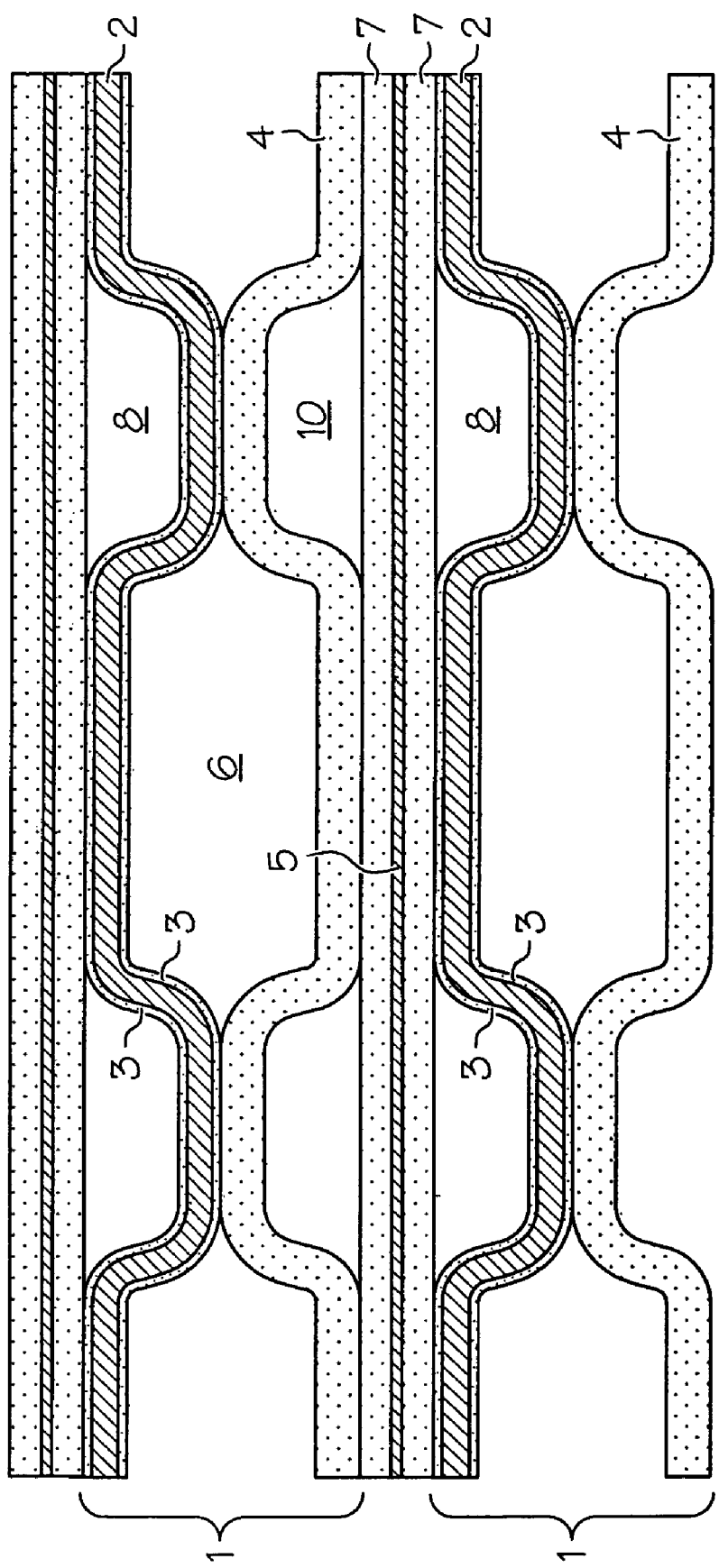
FIG. 2 is a cross-sectional, partial view of a hybrid bipolar plate assembly arranged in a stack in accordance with the principals of the present invention.
Figure 3:
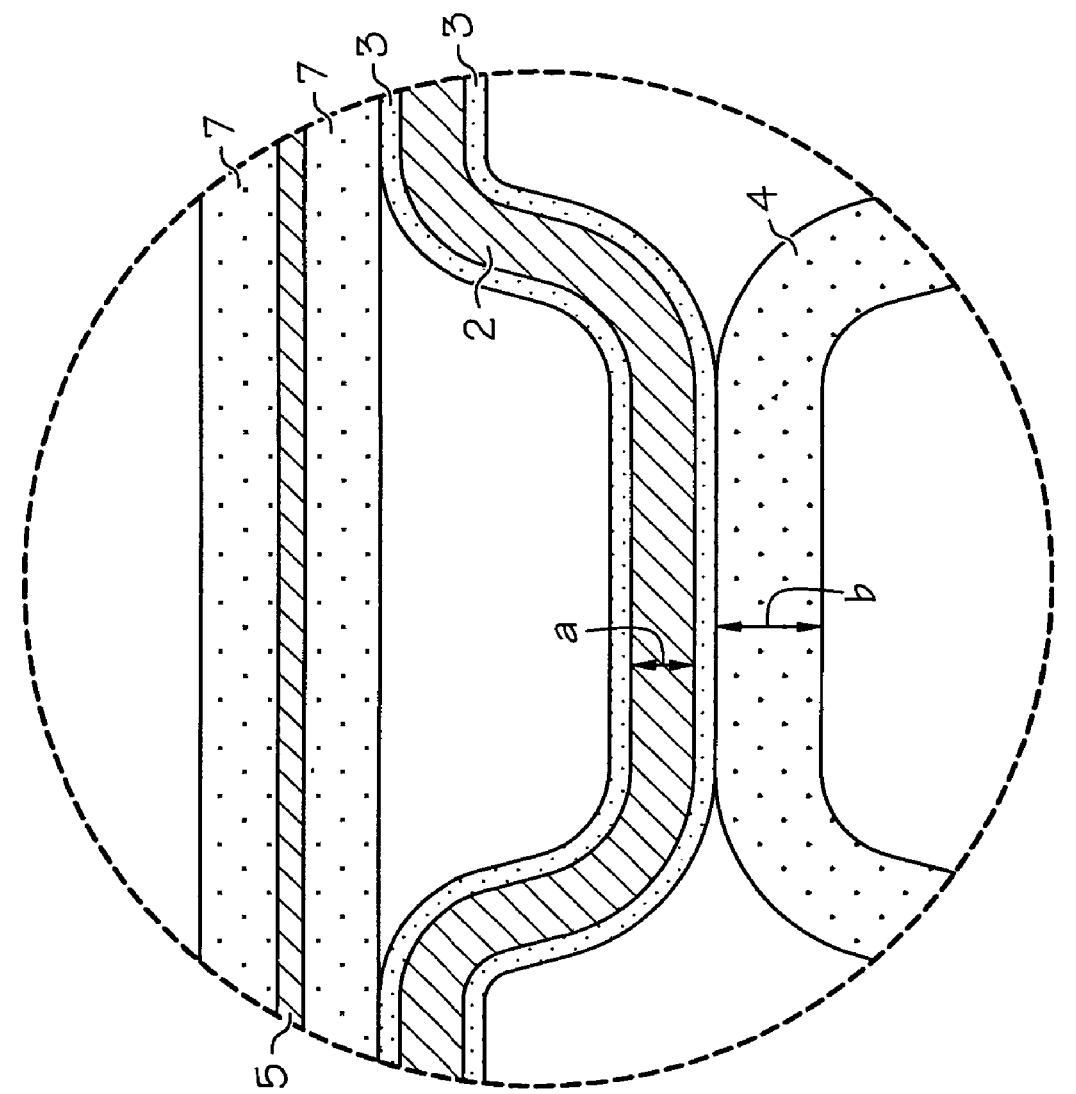
FIG. 3 is an enlarged sectional view of the hybrid bipolar plate assembly illustrated in FIG. 2.

In accordance with one embodiment of the present invention, a hybrid bipolar plate assembly 1 is provided, which assembly 1 can be used in an electrochemical conversion assembly (e.g., fuel cell). The assembly 1 comprises a metallic anode plate 2, a composite cathode plate 4, and a first layer 3 positioned between the metallic anode plate 2 and the composite cathode plate 4, which hybrid bipolar plate assembly 1 is illustrated in FIGS. 1, 2 and 3. The first layer 3 can comprise at least one of gold, silver and alloys of each. By employing the useful properties of both metals and composites, the hybrid bipolar plate assembly 1 addresses many of the drawbacks typically encountered with conventional bipolar plates that are entirely comprised of either metallic or composite materials. More particularly, the hybrid bipolar plate assembly 1 of the present invention takes advantage of the greater mechanical strength and lower thickness provided by metallic plates, and the improved water management provided by composite plates, as compared to metallic plates. Moreover, unlike composite bipolar plates, metallic plates are essentially impermeable to molecular hydrogen and, therefore, do not allow hydrogen to enter the coolant loops, which can lead to significant losses in fuel cell performance and efficiency.

The metallic anode plate 2 can comprise a corrosion-resistant iron-chromium alloy material (e.g., stainless steel), and the composite cathode plate 4 can comprise a polymeric material such as a thermosetting resin, a thermoplastic resin, or combinations thereof. The thermosetting resin can be selected from epoxies, malamines, phenolics, ureas, vinyl esters, polyesters, and combinations thereof, and the thermoplastic resin can be selected from styrenes, acrylics, cellulosics, polyethylenes, polypropylenes, liquid crystalline polymers (polyesters), vinyls, nylons, fluorocarbons, polyphenylene sulfides, and combinations thereof. Typically, the composite cathode plate 4 comprises between about 10 and about 90% by weight graphite powder, which graphite powder can be selected from synthetic graphite, natural graphite, or combinations thereof. The graphite enhances the electrical conductivity of the composite cathode plate 4.

FIG. 1 is an exploded view of the hybrid bipolar plate assembly 1 in accordance with one embodiment of the present invention. The assembly 1 provides a reactant gas flow field characterized by a plurality of serpentine gas flow channels 20 through which the electrochemical conversion assembly's reactant gases (i.e., $H_2$ and $O_2$) flow in a tortuous path from near one edge 22 of the bipolar plate assembly 1 to near the opposite edge 24 thereof. The reactant gas is supplied to channels 20 from a header or supply manifold groove 21 that lies adjacent the edge 22 of the plate assembly 1 at one end of the flow field, and exits the channels 20 via an exhaust manifold groove 23 that lies adjacent the opposite edge 24 of the assembly 1 at the other end of the flow field. Alternatively, the supply and exhaust manifolds 21, 23 can lie adjacent the same edge (i.e., 22 or 24) of the plate assembly 1.

FIG. 2 is a cross-sectional view of a pair of hybrid bipolar plate assemblies 1 that are arranged in a stack in accordance with the present invention. Typically, as illustrated in FIG. 2, a MEA 5 positioned interjacent a pair of diffusion media layers 7 are oriented between the pair of hybrid bipolar plate assemblies 1, which plates are compressed to form one complete cell. It is contemplated that the MEA 5 and diffusion media layers 7 may take a variety of conventional or yet to be developed forms without departing from the scope of the present invention. Although the particular form of the MEA 5 is beyond the scope of the present invention, the MEA 5 can include respective catalytic electrode layers and an ion exchange membrane. Both the metallic anode plate 2 and the composite cathode plate 4 include a plurality of channels which together form passages or "coolant cavities" 6 through which liquid coolant passes during the operation of the electrochemical conversion assembly. Also, the metallic anode and composite cathode plates 2, 4 each comprise one or more anode or cathode channels 8, 10, respectively. The anode channel 8 is configured for the passage of $H_2$ gas and the cathode channel 10 is configured for the passage of $O_2$ gas or air.

Although not wishing to limit the present invention to any particular method of manufacture, the anode channel 8 is typically stamped into the metallic anode plate 2, and the cathode channel 10 is typically molded into the composite cathode plate 4. The depth of these channels 8, 10 is substantially similar. However, the metallic anode plate 2 and composite cathode plate 4 each define a web thickness that can differ given the mechanical properties of the metallic anode and composite cathode plates 2, 4. By "web thickness" we mean the plate thickness between the bottom of the gas channel (anode 8 or cathode 10) and the top of the coolant channel that forms the coolant cavity 6 (see FIG. 2). The composite material that makes up the cathode plate 4 is typically comparably weaker than the metallic material of the anode plate 2.

This is at least partially because of the high loading of graphite that is incorporated into the composite material to increase the electrical conductivity of the cathode plate 4. As such, the metallic anode plate 2 can have a thinner web thickness than the composite cathode plate 4. As shown with more particularity in FIG. 3, the web thickness a of the metallic anode plate 2 is less than the web thickness b of the composite cathode plate 4. Typically, the web thickness a of the metallic anode plate 2 is between about 0.1 and about 0.15 mm, and the web thickness b of the composite cathode plate 4 is between about 0.3 and about 0.8 mm.

As noted herein, the metallic anode plate 2 is configured to be essentially impermeable to molecular hydrogen. As such, the hydrogenous fuel source is maintained within the anode channel 8 and does not permeate into the coolant cavity 6 or escape to the atmosphere. This improves fuel cell performance and efficiency, as hydrogen need not be vented from the coolant cavity 6, which can contribute to evaporation of coolant and inefficient use of hydrogen fuel for the generation of electrical power. In addition, the use of composite material in the manufacture of the cathode plate 4 provides a hybrid bipolar plate assembly 1 with significantly less material cost than conventional entirely metallic bipolar plate assemblies, while still benefiting from the properties of metallic material.

As noted herein, water is produced as a byproduct of the catalytic reaction that occurs within the fuel cell assembly, which water exits the fuel cell through the gas distribution channels. This creates a mass transport problem for the reactive gases (i.e., $H_2$ and $O_2$) that cannot physically reach the catalyst layer to react because the liquid water "plugs" the gas channels. As a result, these cells that are blocked by water in the gas distribution channels exhibit a much lower voltage than the rest of the cells in a fuel cell stack. The performance of these blocked cells can degrade with time until the entire electrochemical conversion assembly fails. Because the individual cells are connected in series by bipolar plates, if one cell fails due to water in the gas distribution channels, the entire fuel cell stack will eventually cease to operate. The frequency of this problem is much higher with metallic bipolar plates compared with composites because of the design and coating material constraints associated with corrosion-resistant metal alloys (e.g., stainless steel materials). Water management is considered as one of the most difficult problems to solve in fuel cells.

In accordance with the present invention, the hybrid bipolar plate assembly 1 enables effective water management at the cathode side of the electrochemical conversion assembly, where water is produced. This is accomplished by employing a composite cathode plate 4, which composite material provides greater design freedom to tailor the geometry of the gas diffusion channels and the resin material properties (hydrophilic and hydrophobic) to effectively and efficiently purge the water out of the gas diffusion channels versus coated stainless steel plates, which material properties do not afford such flexibility. Accordingly, the properties of the composite plate 4 can be easily changed by substituting different binders used in making the composite. In contrast, the geometry of stamped metallic bipolar plates is limited because these materials can tear at large strains during stamping, dependent upon the channel geometry.

In accordance with the present invention, the hybrid bipolar plate assembly 1 can further comprise a metal or metal alloy layer 3 that is applied on one or both sides of the metallic anode plate 2. The metal or metal alloy layer 3 should be chemically stable in the presence of a coolant if positioned to be in contact therewith. Suitable materials for the metal or metal alloy include but are not limited to gold, gold alloys, silver and silver alloys. In the embodiment illustrated in FIGS. 2 and 3, the metal or metal alloy layer 3 is applied to both sides of the metallic anode plate 2. The metal or metal alloy layer 3 is typically pure gold, which can be applied to the metallic anode plate 2 using a physical vapor deposition process such as, for example, electron beam deposition or sputtering, or an electroplating process. The metal or metal alloy layer 3 is typically between about 2 and about 50 nm thick.

Corrosion-resistant iron-chromium alloys such as stainless steel cannot be used in an uncoated state in an electrochemical conversion assembly because of the passive oxide film on its surface, which creates a high contact resistance with the gas diffusion media. The passive layer, which is typically mainly $Cr_2O_3$, protects the metallic alloy from the corrosive environment within the cell, but is electrically resistant. Therefore, in accordance with the present invention, the passive layer is reduced or removed via hydrofluoric acid etching or cathodic cleaning, and the surface of the metallic alloy plate 2 is typically coated with gold in order to minimize the contact resistance on the surface.

Further, in accordance with the present invention, gold is typically employed on the back or coolant side of the metallic anode plate 2 in order to minimize the contact resistance between it and the composite cathode plate 4. This minimizes voltage losses between the cells, which are arranged in series in a stack. A lower bond line resistance is desirable to avoid voltage losses through the bond lines. The bond line resistance between the gold-coated metallic anode plate 2 and the composite cathode plate 4 is typically between about 1.8 and about 2 mOhm-cm$^2$. Accordingly, the present invention allows for the elimination of conventional bonding processes that are typically cost prohibitive for both metallic and composite plates.

An adhesive can be used around the perimeter of the metallic anode 2 and composite cathode plates 4 in order to seal the stack and prevent coolant from leaking out from the hybrid bipolar plate assembly 1. The adhesive can be either conductive or non-conductive, and can be selected from a thermosetting resin, a thermoplastic resin, or combinations thereof, such as, for example, epoxies, phenolics, acrylics, urethanes, polyesters, etc. The adhesive can be applied using any one of the following processes: dispensing, screen and silk printing, spray and roll coating, etc. Alternatively, a gasket configured to prevent coolant from leaking out from the hybrid bipolar plate assembly 1 can be employed with or without the adhesive sealant. In accordance with the present invention, the direct contact between the composite cathode plate 4 and the typically gold coated metallic anode plate 2, with or without the use of the conductive or non-conductive adhesive around the outside perimeter of the plates 2, 4, maintains the integrity of the fuel cell stack and is cost effective.

Figure 4:
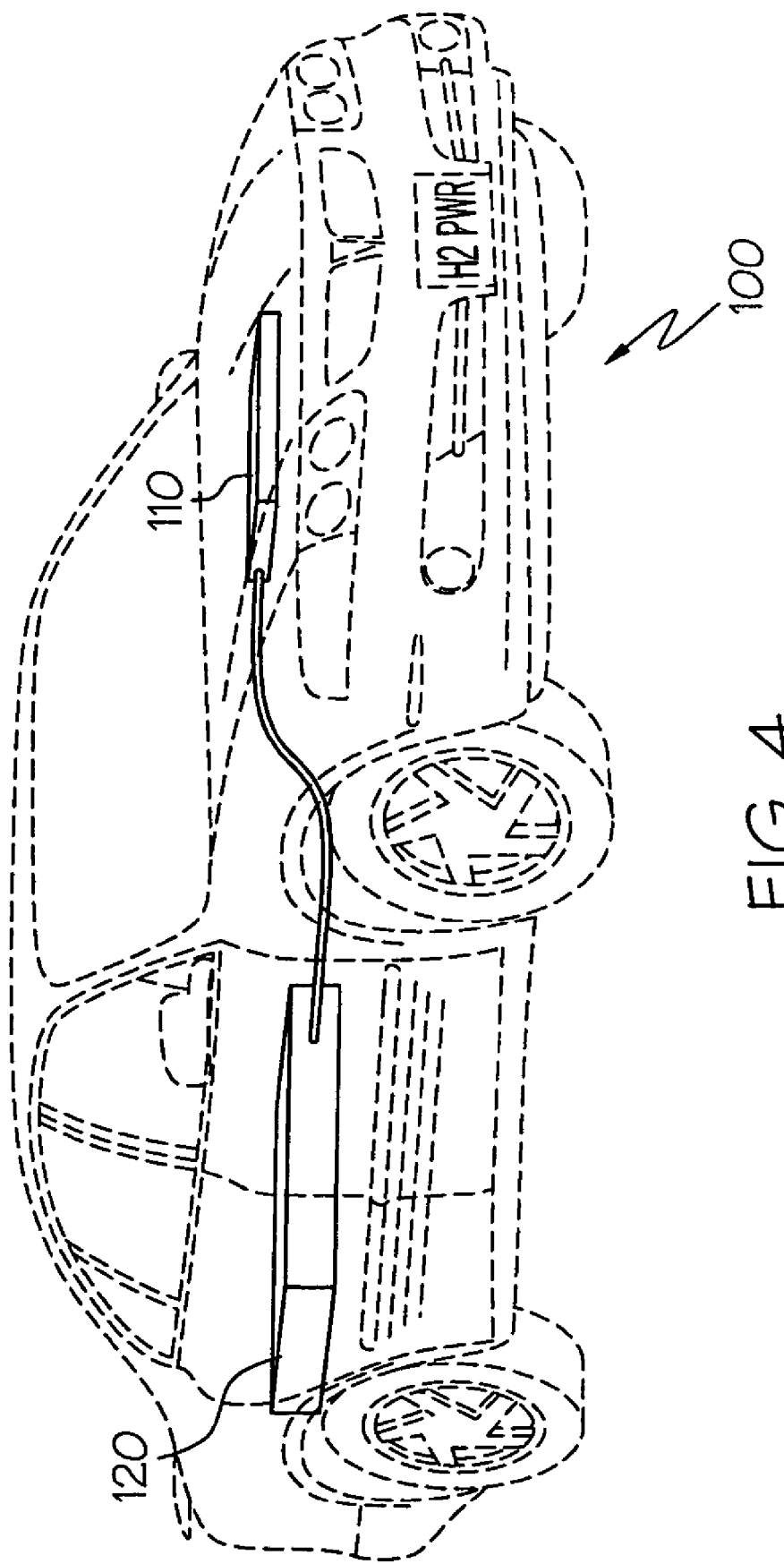
FIG. 4 is a schematic illustration of a vehicle incorporating an electrochemical conversion assembly in accordance with the principals of the present invention.

Referring now to FIG. 4, a fuel cell system incorporating at least one hybrid bipolar plate assembly according to the present invention may be configured to operate as a source of power for a vehicle 100. Specifically, fuel from a fuel storage unit 120 may be directed to a fuel cell assembly 110 configured to convert fuel, e.g., $H_2$, into electricity. The electricity generated is used as a motive power supply for the vehicle 100 where the electricity is converted to torque and vehicle translational motion. Although the vehicle 100 shown in FIG. 4 is a passenger automobile, it is contemplated that the vehicle 100 can be any vehicle now known or later developed that is capable of being powered or propelled by a fuel cell system, such as, for example, automobiles (i.e., car, light- or heavy-duty truck, or tractor trailer), farm equipment, aircraft, watercraft, railroad engines, etc.

It is noted that terms like "preferably", "commonly" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise a hybrid bipolar plate assembly, a fuel cell incorporating a hybrid bipolar plate assembly according to the present invention, a vehicle incorporating a fuel cell according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A stacked device comprising:
   a first polymer membrane defining opposing cathode and anode faces on opposite sides of said first polymer membrane;
   a first layer of catalyst defining opposing inside and outside faces on opposite sides of said first layer of catalyst, said inside face engaging said cathode face of said first polymer membrane;
   a second layer of catalyst defining opposing inside and outside faces on opposite sides of said second layer of catalyst, said inside face engaging said anode face of said first polymer membrane;
   a first layer of gas diffusion media defining opposing inside and outside faces on opposite sides of said first layer of gas diffusion media, said inside face engaging said outside face of said first layer of catalyst;
   a second layer of gas diffusion media defining opposing inside and outside faces on opposite sides of said second layer of gas diffusion media, said inside face engaging said outside face of said second layer of catalyst;
   a first hybrid bipolar plate assembly comprising
      a first metallic anode plate defining opposing inside and outside major faces on opposite sides of said first metallic anode plate, the inside major face of the first metallic anode directly engaging the outside face of the second layer of gas diffusion media, wherein at least one of the inside and outside major faces of the first metallic anode plate comprises a first corrosion-preventive layer comprising at least one of gold, silver, and alloys of each, and
      a first composite cathode plate engaging the outside major face of the first metallic anode plate, wherein said first composite cathode plate comprises a first polymeric material; and
   a second hybrid bipolar plate assembly comprising
      a second composite cathode plate defining opposing inside and outside major faces on opposite sides of the second composite cathode plate, the inside major face of the second composite cathode plate engaging the outside face of the first layer of gas diffusion media, wherein said second composite cathode plate comprises a second polymeric material, and
      a second metallic anode plate defining opposing inside and outside major faces on opposite sides of said second metallic anode plate, the inside major face of the second metallic anode plate engaging the outside major face of the second composite cathode plate, wherein at least one of the inside and outside major faces of the second metallic anode plate comprises a second corrosion-preventive layer comprising at least one of gold, silver, and alloys of each.

2. The stacked device of claim 1, wherein at least one of said first and second metallic anode plates comprise a corrosion-resistant iron-chromium alloy material.

3. The stacked device of claim 1, wherein at least one of said first and second polymeric materials comprise a thermosetting resin, a thermoplastic resin, or combinations thereof.

4. The stacked device of claim 3, wherein said thermosetting resin comprises at least one of epoxies, malamines, phenolics, ureas, vinyl esters, polyesters, and combinations thereof.

5. The stacked device of claim 3, wherein said thermoplastic resin comprises at least one of styrenes, acrylics, cellulosics, polyethylenes, polypropylenes, liquid crystalline polymers, vinyls, nylons, fluorocarbons, polyphenylene sulfides, and combinations thereof.

6. The stacked device of claim 1, wherein at least one of said first and second composite cathode plates comprise between 10% and 90% by weight graphite powder.

7. The stacked device of claim 6, wherein said graphite powder comprises at least one of synthetic graphite, natural graphite, and combinations thereof.

8. The stacked device of claim 1, wherein the inside major face of the first metallic anode plate and the outside face of the second layer of gas diffusion media define one or more anode channels, said anode channels configured for the passage of $H_2$ gas.

9. The stacked device of claim 1, wherein the inside major face of the second composite cathode plate and the outside face of the first layer of gas diffusion media define one or more cathode channels, said cathode channels configured for the passage of $O_2$ gas or air.

10. The stacked device of claim 1, wherein the first metallic anode plate and the first composite cathode plate, or the second metallic anode plate and the second composite cathode plate, or both, define one or more coolant channels for passage of a liquid.

11. The stacked device of claim 1, wherein said first and second metallic anode plates and said first and second composite cathode plates each define a web thickness, said web thickness of said first metallic anode plate is less than said web thickness of said first composite cathode plate, and said web thickness of said second metallic anode plate is less than said web thickness of said second composite cathode plate.

12. The stacked device of claim 11, wherein said web thickness of at least one of said first and second metallic anode plates is between 0.1 mm and 0.15 mm, and wherein said web thickness of at least one of said first and second composite cathode plates is between 0.3 mm and 0.8 mm.

13. The stacked device of claim 1, wherein at least one of said first and second corrosion-preventive layers is between 2 nm and 50 nm thick.

14. The stacked device of claim 1 further comprising an adhesive configured to seal at least one of
   (a) said first metallic anode plate and said first composite cathode plate, or
   (b) said second metallic anode plate and said second composite cathode plate around an outer perimeter of at least one of said first and second hybrid bipolar plate assemblies.

15. The stacked device of claim 14, wherein said adhesive is configured to prevent coolant from leaking out from between said metallic anode plates and said composite cathode plates.

16. The stacked device of claim 14, wherein said adhesive is non-conductive.

17. The stacked device of claim 14, wherein said adhesive is conductive.

18. The stacked device of claim 14, wherein said adhesive comprises at least one of a thermosetting resin, a thermoplastic resin, and combinations thereof.

19. The stacked device of claim 1 further comprising a gasket configured to prevent coolant from leaking out from between said metallic anode plates and said composite cathode plates.

20. The stacked device of claim 1, wherein said stacked device comprises a fuel cell.

21. The stacked device of claim 20 further comprising structure defining a vehicle powered by said fuel cell.

22. The stacked device of claim 1, further comprising:
   a second polymer membrane defining opposing cathode and anode faces on opposite sides of the second polymer membrane;
   a third layer of catalyst defining opposing inside and outside faces on opposite sides of the third layer of catalyst, said inside face engaging the cathode face of the second polymer membrane;
   a fourth layer of catalyst defining opposing inside and outside faces on opposite sides of the fourth layer of catalyst, said inside face engaging the anode face of the second polymer membrane;
   a third layer of gas diffusion media defining opposing inside and outside faces on opposite sides of the third layer of gas diffusion media, said inside face engaging the outside face of the third layer of catalyst; and
   a fourth layer of gas diffusion media defining opposing inside and outside faces on opposite sides of the fourth layer of gas diffusion media, said inside face engaging the outside face of the fourth layer of catalyst, said outside face engaging the outside major face of the second metallic anode plate.

* * * * *